United States Patent
Scharland et al.

(10) Patent No.: US 7,434,022 B1
(45) Date of Patent: Oct. 7, 2008

(54) DISTRIBUTED WORKFLOW TECHNIQUES

(75) Inventors: Michael Scharland, Franklin, MA (US); Arieh Don, Newton, MA (US); Patrick Brian Riordan, Watertown, MA (US); David Joshua Brown, Chelmsford, MA (US); Kenneth A. Halligan, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 495 days.

(21) Appl. No.: 10/880,279

(22) Filed: Jun. 29, 2004

(51) Int. Cl.
*G06F 12/02* (2006.01)
(52) U.S. Cl. .................................... 711/173
(58) Field of Classification Search ................. 711/173
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,930,831 A * | 7/1999 | Marsh et al. | 711/173 |
| 6,314,501 B1 * | 11/2001 | Gulick et al. | 711/153 |
| 6,944,168 B2 * | 9/2005 | Paatela et al. | 370/401 |

* cited by examiner

*Primary Examiner*—Kevin Ellis
*Assistant Examiner*—Hamdy S Ahmed
(74) *Attorney, Agent, or Firm*—Muirhead and Saturnelli, LLC

(57) ABSTRACT

Described is a distributed copying technique that may be used in migrating large amounts of data from one or more source devices to one or more destination devices. The data source is divided into partitions. As Fibre Channel adapters (FAs) become available, each of the FAs may copy a partition of the data. A copy indicator value indicates the last partition delegated to an FA for copying. The last FA to complete copying is responsible for ensuring completed copying of any other data partitions delegated to an FA which has died during migration of the other data partitions. In the event that the last FA dies prior to completing its processing, additional steps are performed by other remaining FAs to copy all data partitions not known to be successfully migrated.

50 Claims, 11 Drawing Sheets

| DIRECTOR | INTERVAL | TIMESTAMP |
|---|---|---|
| 1 | | |
| 2 | | |
| 3 | | |
| .. .. | | |
| N-1 | | |
| N | | |

FIGURE 6

| DIRECTOR | COPY STATE |
|---|---|
| 1 | |
| 2 | |
| 3 | |
| .. .. | |
| N-1 | |
| N | |

FIGURE 7

DISTRIBUTED WORKFLOW TECHNIQUES

BACKGROUND

1. Technical Field

This application generally relates to a data storage system, and more particularly to techniques used with copying data.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. One such task may include making a copy of data. At times, the amount of data to be copied may be a large amount from one or more devices. It may be desirable to have an efficient technique for copying the data in a distributed fashion. It may also be desirable to provide for such a copying technique to use one or more processors as may be available, and to ensure that all the data is copied in the event of a failure of one or more of the processors.

SUMMARY OF THE INVENTION

In accordance with one aspect of the invention is a method for performing a distributed copying of data from a source to a target using a plurality of processors, the method comprising: determining if all partitions of said source have been allocated for copying; if not all of said partitions have been allocated, allocating one of said partitions for copying; updating a migration status for each of said partitions when copying of said each partition is complete; and upon a last executing one of said plurality of processors completing copying an allocated one of said partitions, having said last executing processor copy any of said remaining partitions in accordance with migration status values associated with said remaining partitions. Said determining and said updating may be performed by each of said plurality of processors, and wherein the method may also include: each processor making a determination as to whether there are any remaining portions unallocated upon completing copying of one of said partitions. The last executing processor may determine that all of said partitions have been allocated. The method may also include partitioning said source into said plurality of partitions wherein each partition corresponds to one or more tracks of data on a source device. The method may also include updating a processor status indicator to indicate a copy in progress in response to allocating a partition for copying to said processor and while said processor is copying data from said source to said target. The method may also include determining that a processor is said last executing processor if no other processor has an associated process status indicator indicating a copy in progress by said other processor. The method may also include updating a processor status indicator to indicate a copy completion in response to said processor completing copying of a partition and there are no remaining partitions of said source to be copied. The method may include updating a processor status indicator to indicate that a processor is unavailable for copying in response to said processor not responding within an expected time interval. The method may also include having each of said plurality of processors periodically determine if others of said plurality of processors are unavailable, and if any of said unavailable processors became unavailable while copying data from said source, and if a last processor has died prior to either completing copying of a partition allocated to said last processor, or prior to completing migration of any remaining of said partitions that have not yet been copied from said source to said target. When a first processor determines that no other processors are copying data from said source to said target, and determines that at least one other processor has died prior to copying a partition allocated to said other processor for copying, said first processor may begin copying any remaining partitions from said source to said destination in accordance with migration status values for said remaining partitions. The determining may use a value that is globally accessible to all processors that may copy one of said plurality of partitions, and wherein said value may be updated by each of said plurality of processors as said each processor is allocated one of said partitions. The source may include a plurality of devices, and wherein for at least one of said plurality of devices, less than all data on said at least one device may be included in said source for copying to said target. The plurality of processors may be included in a data storage system, said source may be included in said data storage system, and said plurality of processors may be pushing data from said source to said target in a remote data storage system. The plurality of processors and said target may be included in a data storage system, and said plurality of processors may be pulling data from a remote data storage system including said source.

In accordance with another aspect of the invention is a distributed method for performing a task, the method comprising: determining if all partitions of said task have been allocated for execution; if not all of said partitions have been allocated, allocating one of said partitions; updating a completion status for each of said partitions when execution of said each partition of said task is complete; and upon a last executing one of said plurality of processors completing execution of an allocated one of said partitions of said task, having said last executing processor complete execution of any of said remaining partitions of said task in accordance with status values associated with said remaining partitions. The determining and said updating may be performed by each of said plurality of processors, and wherein the method may further comprise each processor making a determination as to whether there are any remaining portions unallocated upon completing execution of one of said partitions. The last executing processor may determine that all of said partitions have been allocated. The method may also include partitioning said task into said plurality of partitions wherein each partition corresponds to performing a portion of processing steps of said task. The method may include updating a processor status indicator to indicate a work in progress in response to allocating a partition for execution to said processor and while said processor is executing processing steps to complete said partition. The method may include determining that a processor is said last executing processor if no other processor has an associated process status indicator indicating a work in progress by said other processor. The method may include updating a processor status indicator to indicate a task completion in response to said processor completing execution of a partition and there are no remaining partitions of said task to be completed. The method may also include updating a processor status indicator to indicate that a processor is unavailable in response to said processor not responding within an expected time interval. The method may also include having each of said plurality of processors periodically determine if others of said plurality of processors are unavailable, and if any of said unavailable processors became unavailable while executing said partition, and if a last processor has died prior to either completing execution of a partition allocated to said last processor, or prior to completing execution of any remaining of said partitions. When a first processor determines that no other processors are executing a partition of said task, and determines that at least one other processor has died prior to completing execution of a partition of said task allocated to said other processor, said first processor may begin executing any remaining partitions in accordance with status values for said remaining partitions. The determining may use a value that is globally accessible to all processors that may execute one of said plurality of partitions, and wherein the value may be updated by each of said plurality of processors as said each processor is allocated one of said partitions.

In accordance with another aspect of the invention is a computer program product for performing a distributed copying of data from a source to a target using a plurality of processors, the computer program product comprising code that: determines if all partitions of said source have been allocated for copying; if not all of said partitions have been allocated, allocates one of said partitions for copying; updates a migration status for each of said partitions when copying of said each partition is complete; and upon a last executing one of said plurality of processors completing copying an allocated one of said partitions, having said last executing processor copy any of said remaining partitions in accordance with migration status values associated with said remaining partitions. The code that determines and said code that updates may be performed by each of said plurality of processors, and wherein the computer program product may further comprise each processor including code that makes a determination as to whether there are any remaining portions unallocated upon completing copying of one of said partitions. The last executing processor may determine that all of said partitions have been allocated. The computer program product may also include code that partitions said source into said plurality of partitions wherein each partition corresponds to one or more tracks of data on a source device. The computer program product may also include code that updates a processor status indicator to indicate a copy in progress in response to allocating a partition for copying to said processor and while said processor is copying data from said source to said target. The computer program product may also include code that determines that a processor is said last executing processor if no other processor has an associated process status indicator indicating a copy in progress by said other processor. The computer program product may also include code that updates a processor status indicator to indicate a copy completion in response to said processor completing copying of a partition and there are no remaining partitions of said source to be copied. The computer program product may also include code that updates a processor status indicator to indicate that a processor is unavailable for copying in response to said processor not responding within an expected time interval. The computer program product may also include code in each of said plurality of processors causing said each processor to periodically determine if others of said plurality of processors are unavailable, and if any of said unavailable processors became unavailable while copying data from said source, and if a last processor has died prior to either completing copying of a partition allocated to said last processor, or prior to completing migration of any remaining of said partitions that have not yet been copied from said source to said target. When a first processor determines that no other processors are copying data from said source to said target, and determines that at least one other processor has died prior to copying a partition allocated to said other processor for copying, said first processor may begin copying any remaining partitions from said source to said destination in accordance with migration status values for said remaining partitions. The code that determines may use a value that is globally accessible to all processors that may copy one of said plurality of partitions, and wherein said value may be updated by each of said plurality of processors as said each processor is allocated one of said partitions. The source may includes a plurality of devices, and wherein for at least one of said plurality of devices, less than all data on said at least one device may be included in said source for copying to said target. The plurality of processors may be included in a data storage system, said source may be included in said data storage system, and said plurality of processors may be pushing data from said source to said target in a remote data storage system. The plurality of processors and said target may be included in a data storage system, and said plurality of processors may be pulling data from a remote data storage system including said source.

In accordance with another aspect of the invention is a computer program product for performing a distributed task, the computer program product comprising code that: determines if all partitions of said task have been allocated for execution; if not all of said partitions have been allocated, allocates one of said partitions; updates a completion status for each of said partitions when execution of said each partition of said task is complete; and upon a last executing one of said plurality of processors completing execution of an allocated one of said partitions of said task, having said last executing processor complete execution of any of said remaining partitions of said task in accordance with status values associated with said remaining partitions. The code that determines and said code that updates may be performed by each of said plurality of processors, and wherein the computer program product may further comprise each processor including code that makes a determination as to whether there are any remaining portions unallocated upon completing execution of one of said partitions. The last executing processor may determine that all of said partitions have been allocated. The computer program product may also include code that partitions said task into said plurality of partitions wherein each partition corresponds to performing a portion of processing steps of said task. The computer program product may also include code that updates a processor status indicator to indicate a work in progress in response to allocating a partition for execution to said processor and while said processor is executing processing steps to complete said partition. The computer program product may also include code that determines that a processor is said last executing processor if no other processor has an associated process status indicator indicating a work in progress by said other processor. The computer program product may also include code that updates a processor status indicator to indicate a task completion in response to said processor completing execution of a partition and there are no remaining partitions of said task to be completed. The computer program product may also include code that updates a processor status indicator to indicate that a processor is unavailable in response to said processor not responding within an expected time interval. Each of said plurality of processors may include code that periodically determines if others of said plurality of processors are unavailable, and if any of said unavailable processors became unavailable while executing said partition, and if a last processor has died prior to either completing execution of a partition allocated to said last processor, or prior to completing execution of any remaining of said partitions. When a first processor determines that no other processors are executing a partition of said task, and determines that at least one other processor has died prior to completing execution of a partition of said task allocated to said other processor, said first processor may begin executing any remaining partitions in accordance with status values for said remaining partitions. The code that determines may use a value that is globally accessible to all processors that may execute one of said plurality of partitions, and wherein said value may be updated by each of said plurality of processors as said each processor is allocated one of said partitions.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example of an embodiment of a heartbeat table;

FIG. 7 is an example of an embodiment of a copy state bitmap;

DETAILED DESCRIPTION OF EMBODIMENT(S)

Figure 1:
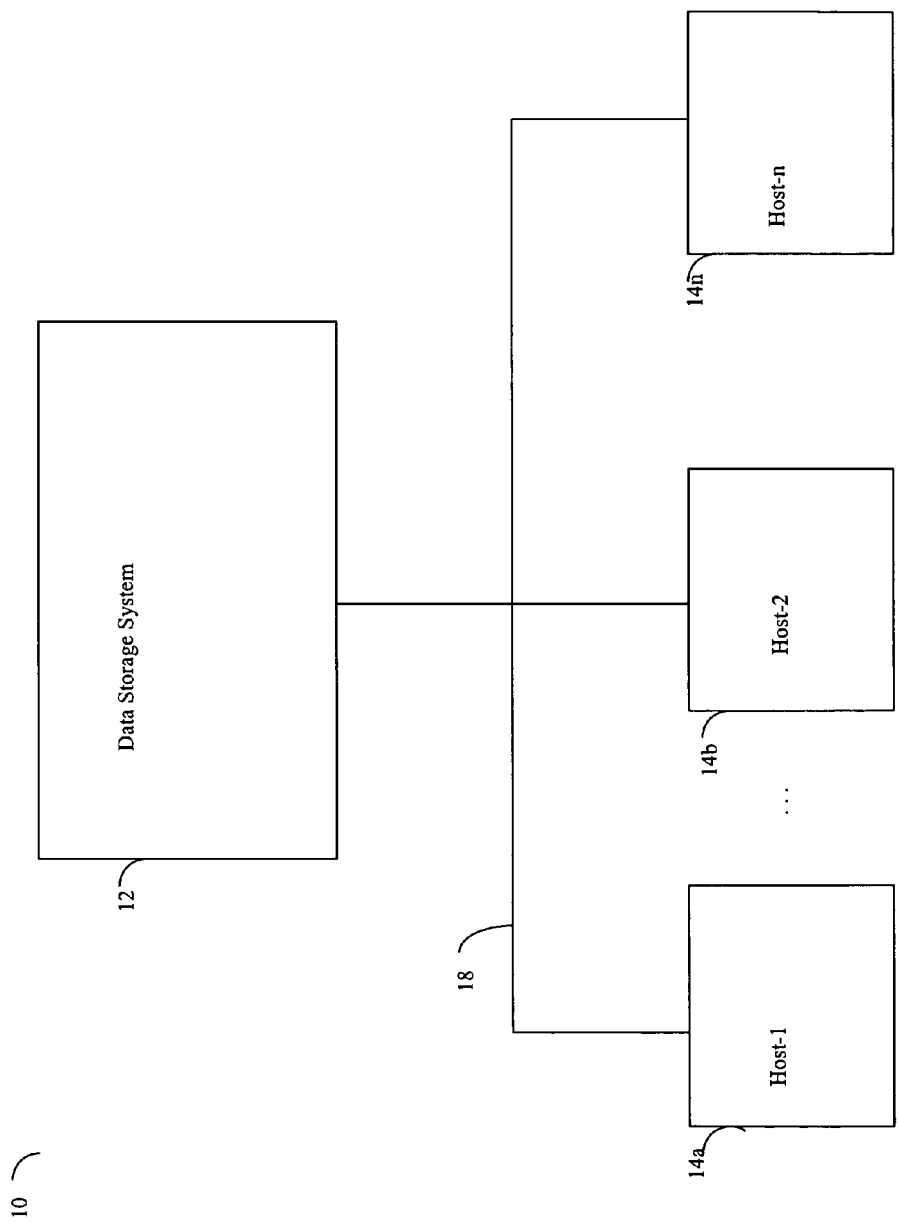
FIG. 1 is an example of an embodiment of a computer system according to the present invention.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
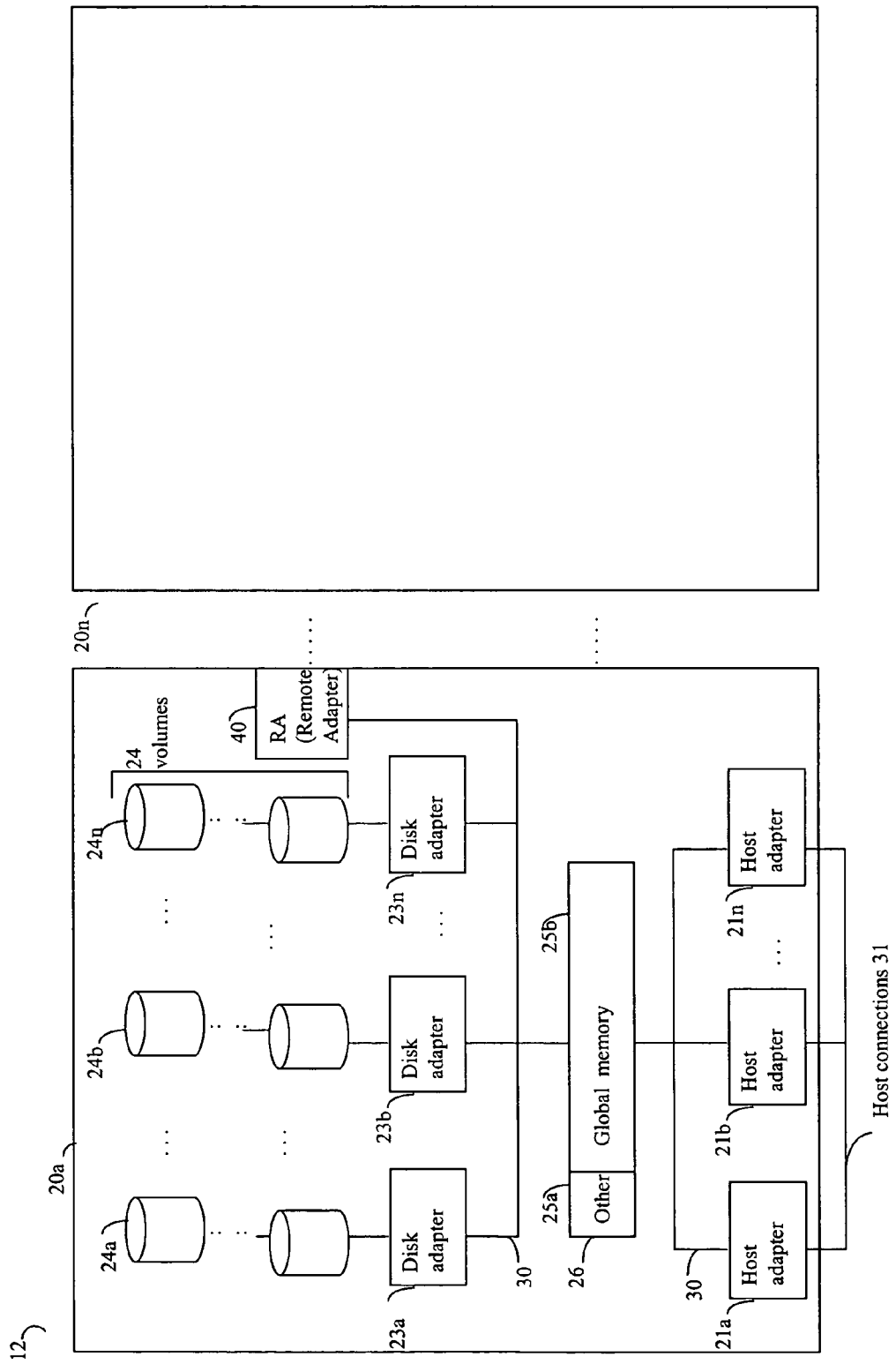
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
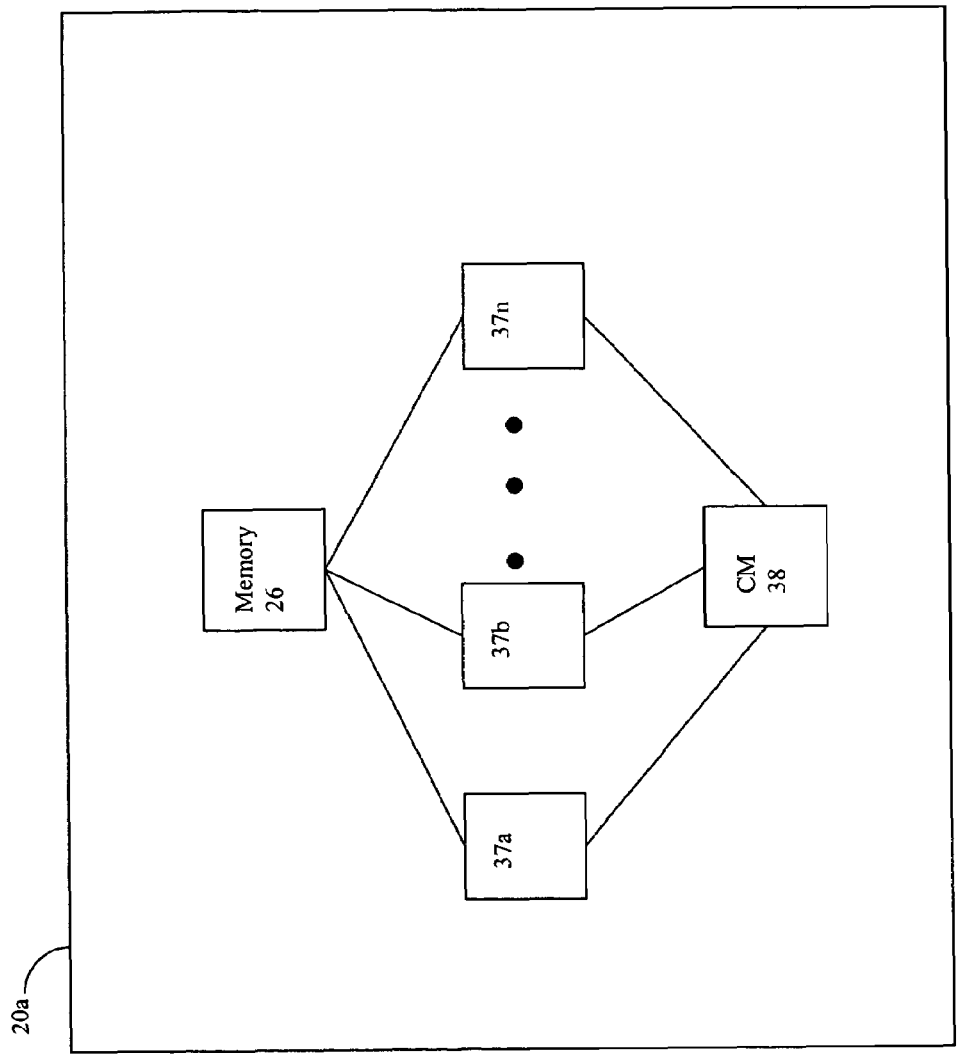
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
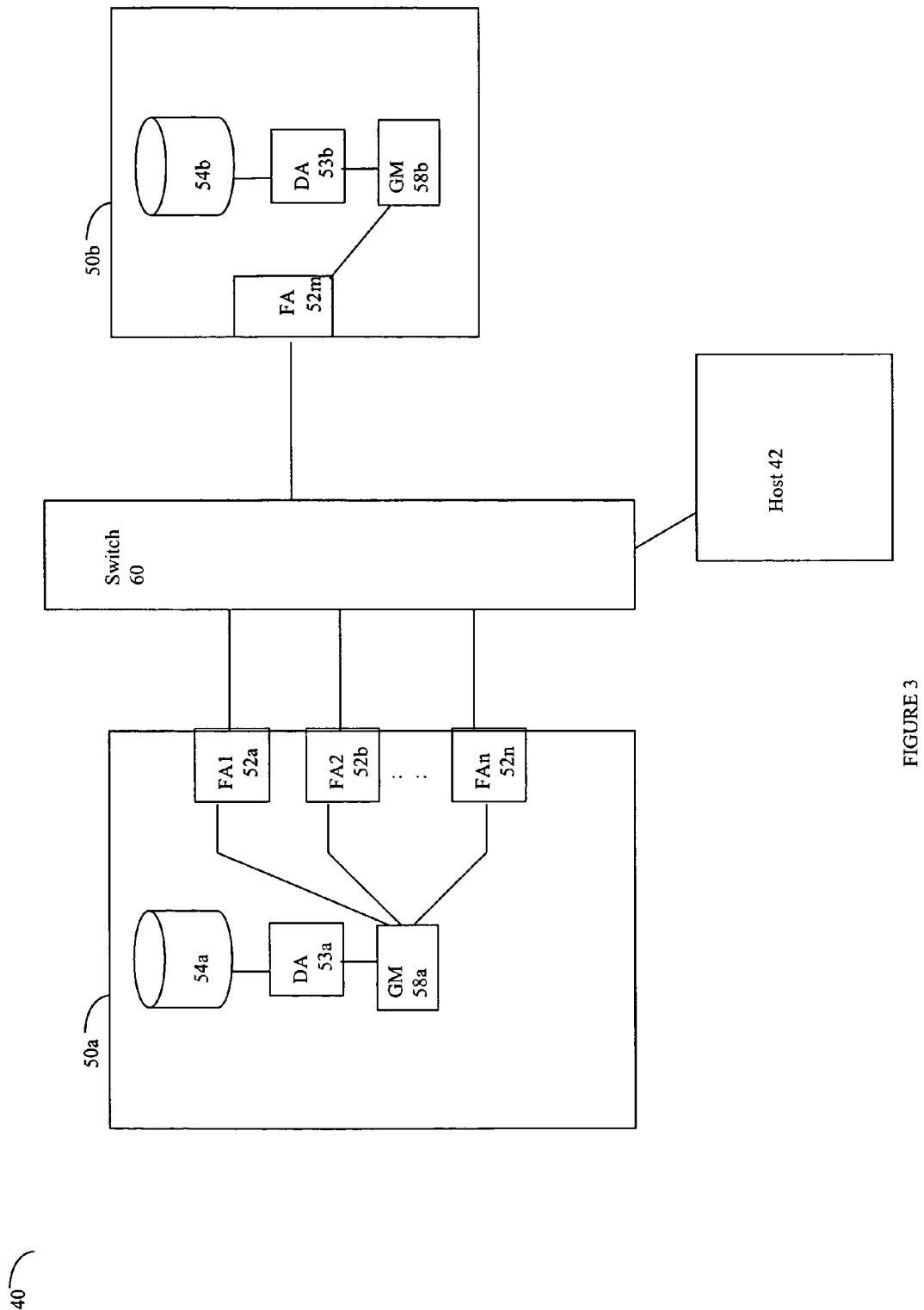
FIG. 3 is a simplified illustration of an example of an embodiment of the computer system that may be used in connection with the techniques described herein.

Referring now to FIG. 3, shown is an example of an embodiment of a computer system 40 that may be used in connection with the techniques described herein. It should be noted that the embodiment illustrated in FIG. 3 is a simplified view of components of a computer system as generally illustrated in FIGS. 1 and 2A, for example, including only some detail of the data storage systems 50a and 50b for the sake of illustration.

Included in the system 40 are data storage systems 50a and 50b, a switch 60 and a host 42. Each of the data storage systems 50a and 50b and the host 42 may communicate using switch 60. In this example, the data storage system 50a includes a data storage device 54a, a DA 53a, global memory (GM) 58a, and multiple Fibre Channel Adapters (FAs) 52a-52n. Each of the FAs 52a-52n has a Fibre Channel connection to the switch 60 to facilitate communications with the data storage system 50b and the host 42. The data storage system 50b includes FA 52m with a Fibre Channel connection to the switch 60 to handle communications between the switch 60 and the data storage system 50b. The data storage system 50b also includes a data storage device 54b serviced by DA 53b and GM 58b.

The host 42 may issue a command to data storage system 50a through switch 60 and one of the FAs 52a-52n. Similarly the host may communicate with the data storage system using switch 60 and FA 52m. As will be described in more detail in following paragraphs in one illustration, the data storage systems 50a may communicate with data storage system 50b over switch 60 using one or more of the FAs 52a-52n and FA 52m in which data may be copied from device 54a of data storage system 50a to device 54b of data storage system 50b.

A command may be issued from the host 42, other system connected to the data storage systems (not shown), or from a task executing within the data storage system 50a, to create a copy of the data from device 54a to remote device 54b. This command may cause a copy task to execute within the data storage system 50a to copy the data to system 50b. In one embodiment, with reference to FIG. 3, the FAs 52a-52n may execute code to perform the copying of data from 54a to 54b. Data may be copied from 54a by DA 53a to GM (Global Memory) 58a. Data from GM 58a may then be communicated to one of FA52a-52n, switch 60, and then to FA52m where the data may be stored in GM 58b. DA 53b may then transfer the data from GM 58b to the device 54b. The foregoing may be used in creating a copy of data on device 54a on device 54b and may be performed with one or more of FAs 52a-52n using a distributed copying technique described in more detail in following paragraphs.

In utilizing the distributed copying technique described herein, the source data to be copied, such as the data from device 54a, is divided into multiple partitions. Each of these partitions may be copied in a piecewise fashion by multiple FAs from the source to the destination as each FA has available processing cycles to perform a portion of the copying. In one embodiment, each of the device or devices to be copied, such as 54a, may be partitioned into equally sized partitions. Each partition may include one or more tracks of data. The size of each of the partitions may be a value communicated to the one or more FAs in the data storage system 50a in any one or more of a variety of different ways known to those of ordinary skill in the art. For example, the size of each of the partitions may be read from a configuration file, set as an environment variable, or even specified as a value included in the code executed by each of the different FAs. It should be noted that although in this example, the partitions are of a fixed size, an embodiment may also have partitions that are of varying sizes for a single device.

The distributed copying technique of FIG. 3 is described in connection with a data "push" where the FAs are located in the same data storage system as the data source and push the source data to a remote destination. It should also be noted that the techniques described herein may also be used in connection with performing data "pull" where, with reference to FIG. 3, the FAs may be pulling or copying data from the remote data storage system such as 50b to a destination or target data storage system, such as 50a.

Figure 4:
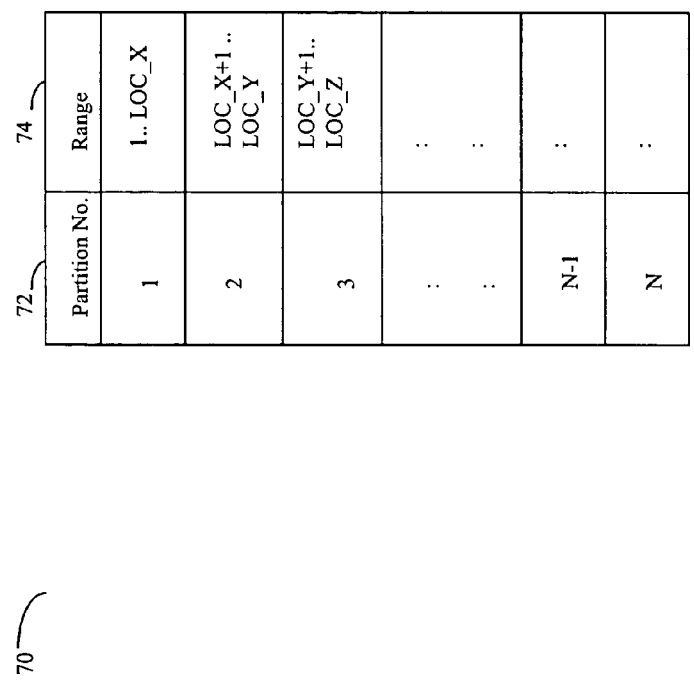
FIG. 4 is an example of an embodiment of a partition size map.

Referring now to FIG. 4, shown is an example representation of a map that may be used in an embodiment with varying partition sizes for a device. The example 70 may be a representation of a partition size map for a device. Included in 70 is a first column 72 with an entry for each partition, and a second column 74 with a range indicator for the corresponding partition. The representation 70 may be stored, for example, in global memory on data storage system 50a accessible for read access by each of the one or more FAs included in data storage system 50a performing the distributed copying technique described herein. It should be noted that in the event that the partitions are of equal size, a map or table such as indicated by the representation 70 may be omitted.

Using the distributed copying technique, as an FA has available processing cycles, the FA is allocated responsibility for migrating or copying a particular partition from data storage system 50a to data storage system 50b. Accordingly, each time an FA becomes idle, that particular FA may copy a remaining partition from the source to the destination or target device in the data storage system 53b. Use of a distributed copying technique as described herein provides for a flexible distribution of copying between various FAs available at particular points in time.

Figure 5:
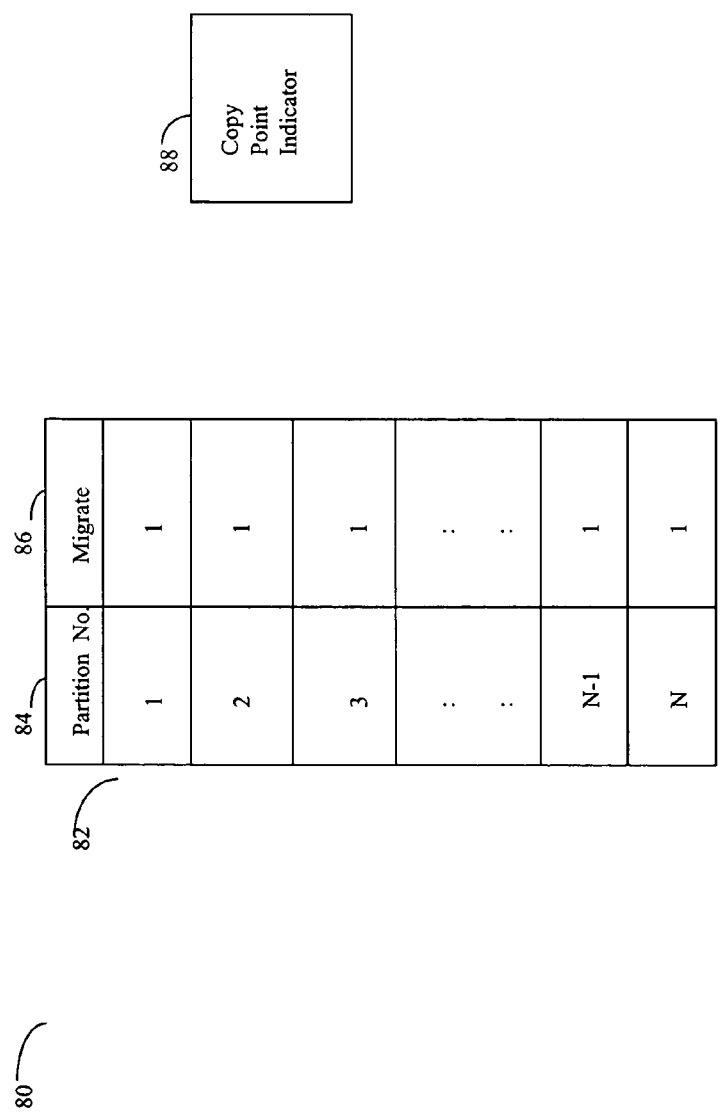
FIG. 5 is an example of an embodiment of a migration bitmap and copy point indicator.

Referring now to FIG. 5, shown is an example 80 of a migration bitmap 82 and a copy point indicator 88 that may be used in facilitating the distributed copying technique. The migration bitmap 82 includes a first column 84 with a partition number having a corresponding entry in column 86 with a migration status. The migration bitmap 82 and copy point indicator 88 may be stored in the global memory of a data storage system which includes the FAs accessing the bitmap 82. An embodiment may include a migration bitmap for each device, or portion thereof, to be copied. In one embodiment, the migration bitmap may have all entries in column 86 initialized to one (1) indicating that each partition of data has not yet been migrated or copied from the source to the destination device. As each particular partition of data is migrated or copied from the source to the destination device, the partition's corresponding entry in the migration bitmap in column 86 is set to zero.

Figure 6:
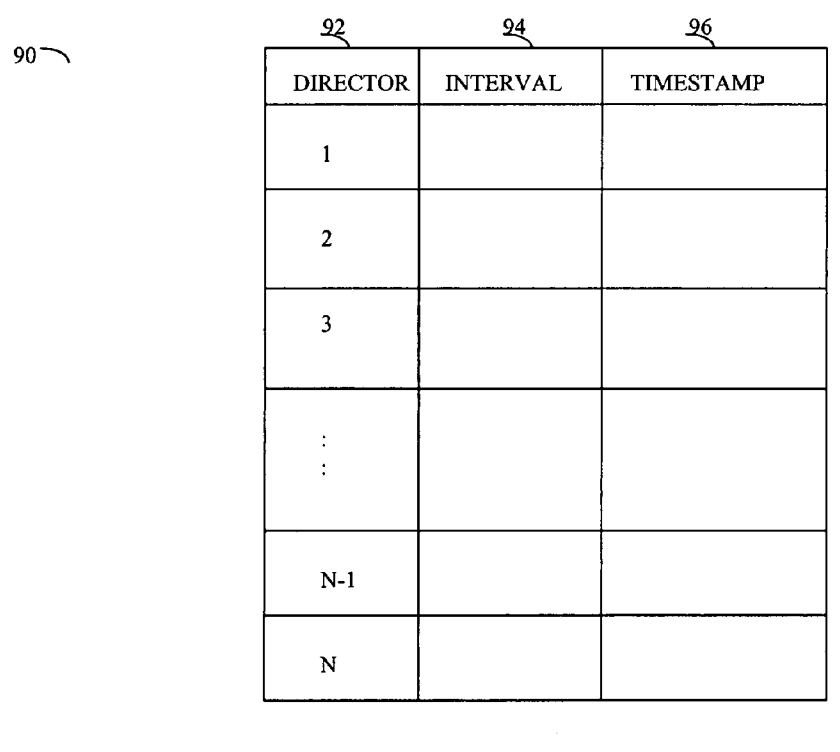
Figure 7:
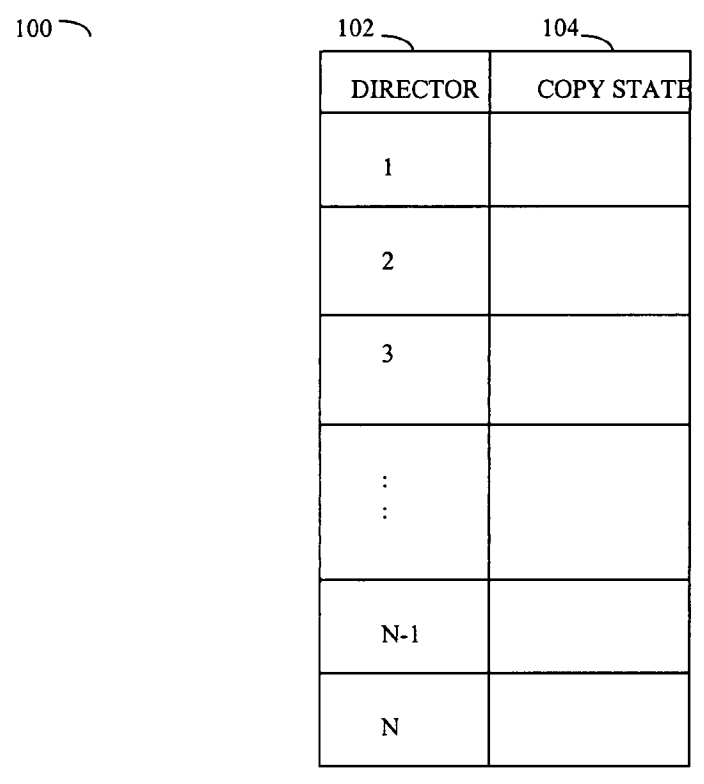

Access to the migration bitmap 82 and other resources described herein, such as the copy point indicator 88 and tables of FIGS. 6 and 7, used in performing the distributed copying processing may be synchronized using any one or more different techniques known to those of ordinary skill in the art which may also vary in accordance with each embodiment and synchronization mechanisms available therein. It should be noted that although processing steps refer to accessing the shared resources without explicit mention of using any synchronization to ensure exclusive access, use of such synchronization techniques in connection with processing described herein will be apparent to those of ordinary skill in the art.

The copy point indicator 88 is a value representing the last partition or high water mark allocated to an FA for copying. As a particular FA becomes available to perform a portion of the copying, the FA reads and updates the copy point indicator variable 88 which may also be stored in global memory of a data storage system. The FA currently reading the value of the copy point indicator increments the copy point indicator to reflect the location that the FA will begin copying the next subsequent partition from. Once an FA has completed migrating the data for a particular partition from the source to the destination device, the FA updates the appropriate migration status in column 86 of the migration bitmap 82 for the partition which has just been migrated.

Prior to any migration of the data for a particular device or devices being performed, the copy point indicator 88 may be initialized to a value, such as zero (0) or −1 indicating that no partitions have yet been migrated from the source to the destination device.

Referring back to FIG. 3 to illustrate the distributed copying technique thus far described, each of the FAs 52a-52n of data storage system 50a may be designated as possible candidates for participating in the distributed copying technique for copying data from device 54a to device 54b. Initially, FA1 52a may be the first FA having available processor cycles. FA1 reads the copy point indicator 88 which indicates that no partitions have yet been migrated. Accordingly, FA1 updates the copy point indicator and claims responsibility for migrating the first partition and accordingly setting the copy point indicator to this value. FA1 then begins migrating the first partition of data. While FA1 is copying the first partition, FA2 becomes idle and reads and updates the copy point indicator 88 indicating that FA2 will migrate a second partition of data. While both FA1 and FA2 are copying their respective partitions, FA3 now becomes available and reads and updates copy point indicator 88 indicating that FA3 will migrate the third partition of data. At this point, each of FA1 through FA3 may be in the process of migrating a different partition from the source to the destination device. Each of FA1 through FA3 performing its copying independent of the other FAs.

The particular configuration of the FAs within a data storage system may vary with each embodiment and this may affect the rate at which a particular FA is able to copy a particular partition. For example, a particular FA may also be connected to, and handle communications for, a host such as host 42. However, one or more particular FAs, such as FA1, may not be responsible for handling host communications and may have more idle processor cycles to allocate to copying data. The foregoing describes a distributed, unbalanced system such that whenever a particular FA is available and free, that particular FA may copy the next subsequent partition which has not yet been allocated for migration to an FA.

In connection with the distributed copying technique described herein, one of the FAs may cease processing or otherwise become unavailable for copying. Such a status of an FA, or other director, may be characterized as a dead state. Additional steps may be taken to ensure that the copying from the source to the destination device is complete even when an FA enters the dead state without completing migration of an allocated partition. In order to determine whether a particular director is dead or alive, an embodiment may use any one or more of a variety of different techniques. In one embodiment, each of the directors, including the FAs as well as DAs, and other directors within a data storage system, may update a particular location in global memory at predetermined time intervals. The foregoing may be characterized as a heartbeat of each of the different directors. In the event that a heartbeat is not detected for a first director by a second director, the second director may conclude that the first director is in a dead state.

Referring now to FIG. 6, shown is an example representation 90 of a heartbeat table that may be stored in global memory on a data storage system. Each director, including DAs, RAs, and FAs, may be associated with a unique row in the representation 90 as indicated by the director identifier in column 92. Each director may be expected to report or update the time stamp value in column 96 at each particular interval as indicated by column 94. The repeated recordation and reporting of the time stamp in column 96 at each of the particular time period intervals as indicated by column 94 may be characterized as the heartbeat of the associated director as indicated in column 92. In the event that the current time advances past the last time stamp value plus the interval for a first director, other directors in this embodiment assume that the first director is in the dead state. In addition to each director being expected to update or write its corresponding time stamp value into the global memory at pre-determined time intervals, each director also reads the values in the representation 90 in order to determine which other director may have entered the dead state. For example, as part of normal processing, each director may check the heartbeat status of every other director once a second, or other time period that may vary with each embodiment. In the event that a particular director detects that another director is dead because a heartbeat has not been received within an expected time period, that particular director may then update other values as may be maintained within the global memory to indicate that this particular director is now dead rather than alive. It should be noted that although only the FAs in this particular example are used in performing the distributed copying technique, FAs, RAs, DAs and other directors within a data storage system may perform a determination that a particular FA is in the dead state and accordingly update one or more pieces of state information that may be included in the global memory to indicate a change in director status from alive to dead.

In the event that each of the directors has the same time interval or heartbeat period within which a time stamp update is expected, the table 90 may omit the intervals 94.

Referring now to FIG. 7, shown is a representation of a copy state bitmap 100 that may be used to indicate the copy state of each of the one or more FAs. In one embodiment, the copy state of an FA may be one of four particular states including not participating, copy in-progress, copy is failed or dead, and copy complete or done. The first state of not participating may be used during configuration to designate that a particular FA will not participate in a distributed copying technique. The copy in-progress state may indicate that the particular associated FA is in the process of copying a partition. The failed or dead status is used to indicate that a particular director has gone off line or is otherwise unavailable for performing a copy technique. For example, in the event that a first director determines that a second director which is an FA has a heartbeat that not been received within an expected time period, the first director may update the second director's copy state in the representation at 100 to indicate that that particular director is dead. It should also be noted that a particular director may change its own copy state to indicate a failed or dead when performing particular operations such as, for example, when an FA detects that it is entering a shut-down state. A copy done or complete copy state may be entered once a particular FA has completed migration of a partition from a source to the destination device and there are no remaining partitions to be copied. It should be noted that an embodiment may have other copy states than as described herein. In the event that one or more of the FAs enters a dead state and does not complete copying or migrating a partition, processing steps are taken to ensure that all partitions are copied for those FAs which have failed to complete migrating a claimed partition.

What will now be described are processing steps of the distributed copying technique including steps to ensure copying of a first partition associated with an FA which has died while the FA's status indicates a copy in-progress for the first partition.

Figure 8:
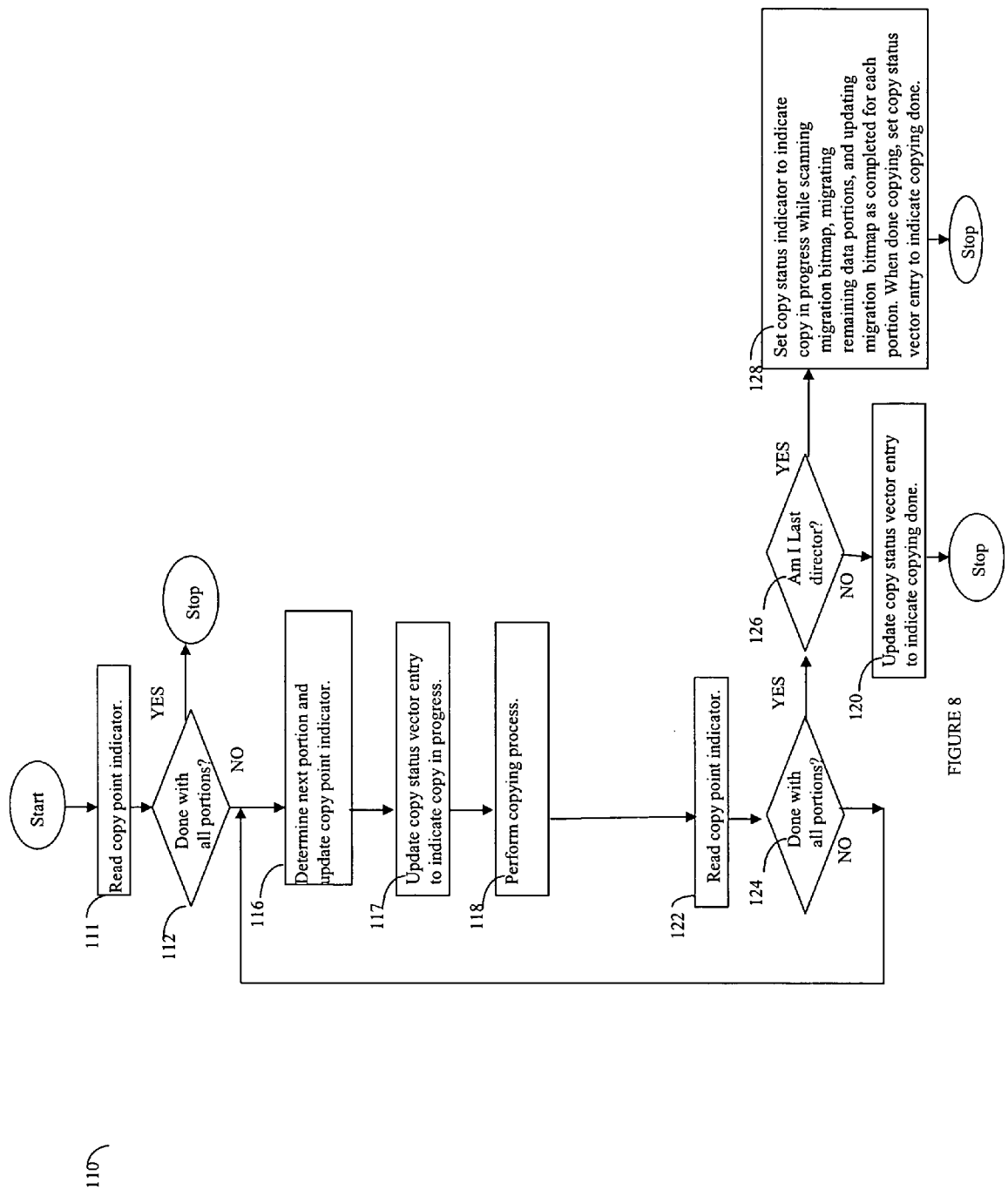
FIGS. 8 and 9 are flowcharts of processing steps of one embodiment for performing a distributed copying technique.

Referring now to FIG. 8, shown is a flowchart 110 of processing steps that may be performed for a distributed copying technique. The processing steps of flowchart 110 may be performed by each of the FAs, for example, by executing code to perform the processing steps of flowchart 110. At step 111, the copy point indicator value is read. At step 112, a determination is made as to whether the copy point indicator indicates that all partitions have been copied. If so, processing of flowchart 110 stops. Otherwise, control proceeds to step 116 to determine the next partition to be copied and accordingly update the copy point indicator. At step 117, the FA updates its corresponding copy status vector entry to indicate that the FA is currently beginning to copy a partition. At step 118, the FA performs the copying process. Control then proceeds to step 122 to read the copy point indicator. A determination is made at step 124 as to whether all of the partitions have been allocated for copying. If not, control proceeds to step 116 to begin copying the next partition. Otherwise, control proceeds to step 126 where the FA makes a determination as to whether the FA performing the steps of flowchart 110 is the last FA completing copying associated with the migration of the source device. The determination at step 126 may be performed by an FA, for example, by examining the copy state vector 100. An FA may determine that it is the last executing FA if all other FAs have a corresponding copy state which does not indicate that a copy is in-progress. If the current FA determines that it is the last director at step 126, control proceeds to step 128 where the last FA performs a clean-up process to ensure that all of the data for the source device has been migrated. This is performed at step 128 by having the last FA set its copy status indicator to in-progress while scanning the migration bitmap, migrating all unmigrated remaining data portions, and updating the migration bitmap in accordance with any partitions migrated. Upon completion of copying at step 128, the copy status vector entry for that particular FA is updated to indicate that the copying is done or complete. If at step 126 it is determined by the current FA that the current FA is not the last FA performing the copy or migration process, control proceeds to step 120 where the copy status vector entry for that particular FA is updated to indicate that the copying is done or complete. Processing of flowchart 110 then stops.

It should be noted that the foregoing provides for the last FA to perform any necessary clean-up ensuring that all of the data has been migrated from the source to the destination in the event that another FA has died while in the copy in-progress state. As described above, the last FA is the single remaining FA executing steps in connection with performing the copy or migration of a data partition.

An additional problem that needs to be taken into consideration with the distributed copying technique is the possibility that the last FA responsible for the clean-up may also die during the clean-up process, or may die while in the in-progress copying state.

Figure 9:
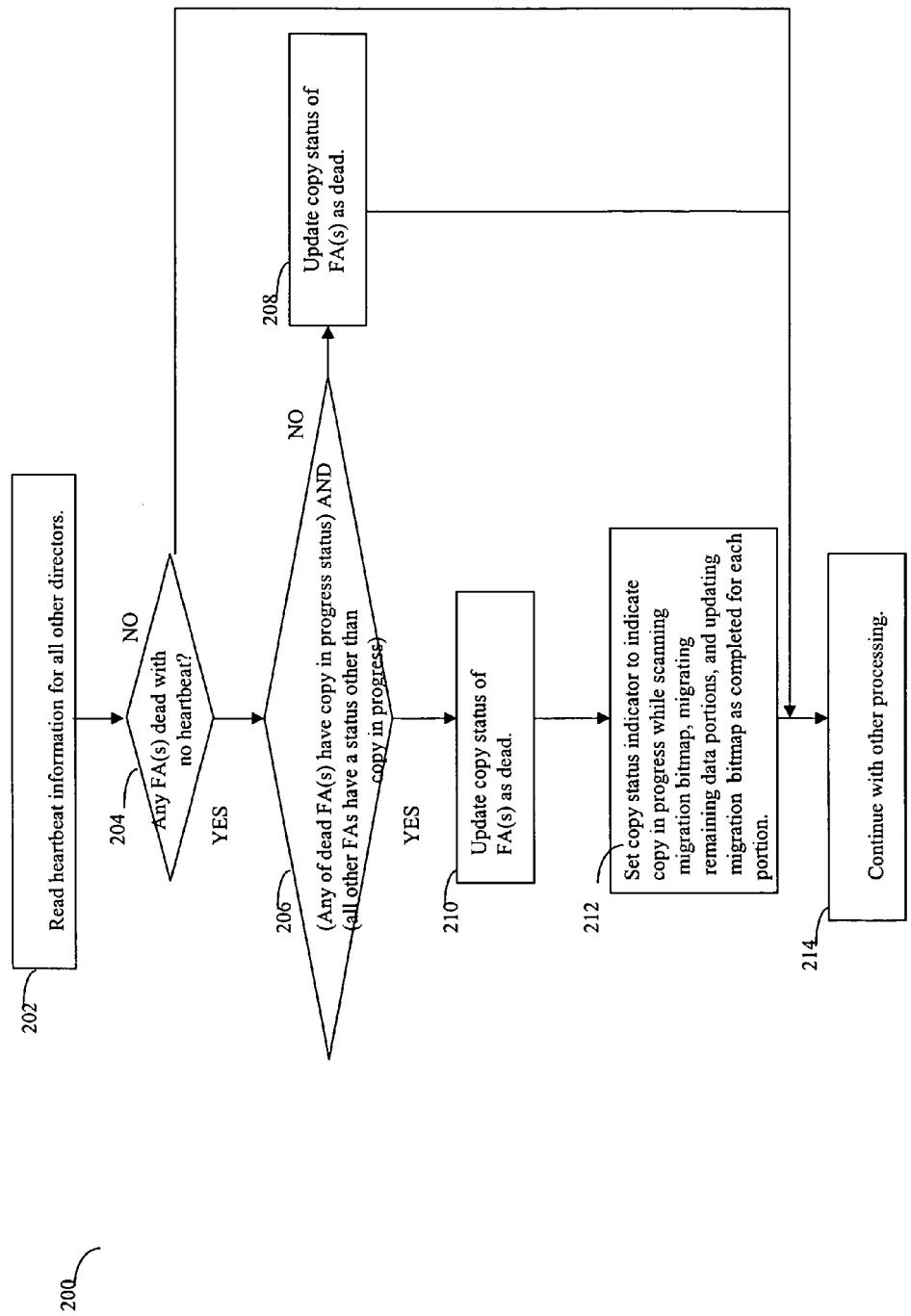

Referring now to FIG. 9, shown is a flowchart 200 of processing steps that may be executed by each of the FAs at pre-determined time intervals as part of normal processing. The steps 200 may be performed as part of a normal processing mode of an FA, for example, as described elsewhere herein in connection with reading and/or writing heartbeat information. At step 202, the heartbeat information for all of the other directors is read. At step 204, a determination is made as to whether any of the FAs may be characterized as dead by not having a heartbeat received within a pre-determined time period. If a determination is made at step 204 that no FAs are dead, control proceeds to step 214 to continue with other processing. If, at step 204, it is determined that an FA may be characterized as dead because its heartbeat has not been received within an expected time period, control proceeds to step 206. At step 206, a determination is made as to whether any of the dead FAs determined at step 204 additionally have a copy status indicating a copy is in-progress, and whether all other directors have a copy status other than copy in-progress. In connection with the determination at step 206, if any of the dead directors have a copy-in-progress status and the heartbeat has not been received within an expected time interval, this may indicate that that particular director has died in the progress of performing the migration. Additionally, if there is any FA having an associated copy status of in-progress whose heartbeat has been received (alive) which is currently performing a copy (in-progress), the current FA does not want to begin the clean-up process (step 212) since there is still a remaining FA executing. Accordingly, the step 206 decision evaluates to yes, only if there is currently no FA in the process of migrating a partition (alive and in progress copy status) and one or more of the FAs has died during a copying process.

If step 206 evaluates to yes, control proceeds to step 210 to update the copy status of the one or more FAs determined as dead at step 204 with no heartbeat. Control proceeds to step 212 to begin the cleanup ensuring that all of the data has been copied from the source to the destination device or devices. At step 212, the FA set its copy status indicator to in-progress while scanning the migration bitmap, migrating all remaining data portions, and updating the migration bitmap in accordance with any partitions migrated. Control proceeds to step 214 to continue other processing.

If step 206 evaluates to no indicating that some of the FAs have died while in the process of migrating a partition but there is at least one FA still executing, control proceeds to step 208 to update the copy status of the one or more FAs determined as dead. Processing continues with step 214. It should be noted that the last FA which is still executing will perform the cleanup of any other FAs which have died during data migration because the last FA (with reference to FIG. 8) will determine that it is the last director and perform the processing of step 128. In the event that the last FA dies while performing the cleanup or while performing a data migration, at some point later, another FA will evaluate step 206 to yes and perform the processing of steps 210 and 212.

It should be noted that multiple directors may perform the processing of flowchart 200 at a particular point in time in the event that the last FA has failed and another FA has failed during a data migration.

Referring back to FIG. 3, the distributed copying technique is described in connection with a data "push" where the FAs are located in the same data storage system as the data source and push the source data to a remote destination. It should also be noted that the techniques described herein may also be used in connection with performing data "pull" where, with reference to FIG. 3, the FAs may be pulling or copying data from the remote data storage system such as 50b to a destination or target data storage system, such as 50a. Such an example using the techniques described herein with a data pull will now be described.

Figure 10:
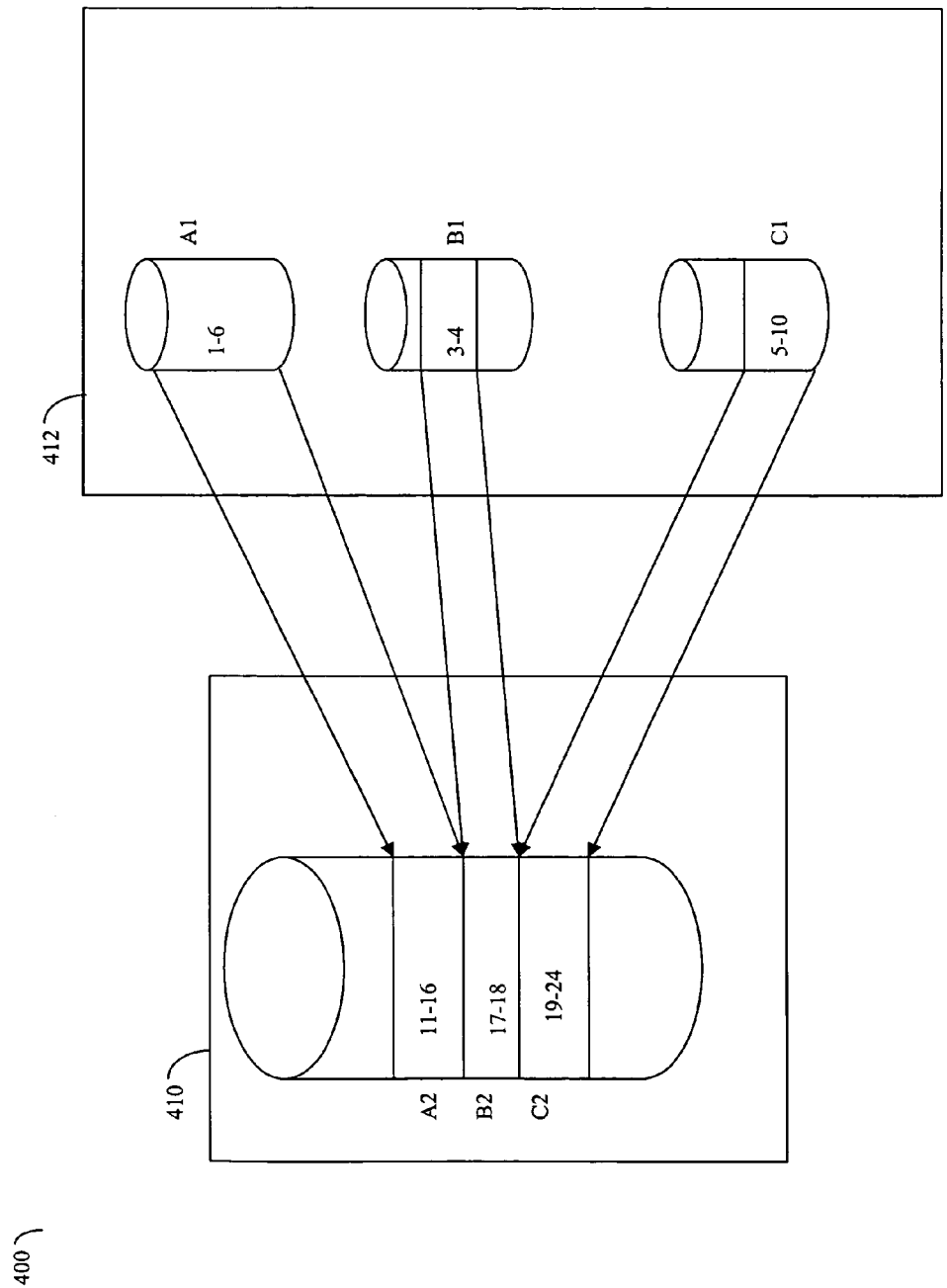
FIG. 10 is an example illustrating a data pull operation with multiple source devices and a single target device with multiple copying sessions.

Referring now to FIG. 10, shown is an example 400 illustrating a source data storage system and a destination or target data storage system with respect to multiple data pull sessions. In this example, the data storage system 410 may be the target data storage system resulting from migrating data from corresponding portions of multiple data storage devices in source data storage system 412. In this example, data is being migrated from data storage devices A1, B1, and C1 of data storage system 412. The entire data portion of device A1 is migrated to the data storage system 410 having a corresponding portion A2 in a first pull session. A portion of device B2 is migrated to the data storage system 410 having a corresponding device portion B2 in a second pull session. The corresponding portion of device C1 is migrated from the data storage system 412 to the data storage system 410 have a corresponding portion C2 in a third pull session. The data migration using the distributed copying technique described herein may be used to copy data from multiple devices. The data copied from a device may be all the data from the device, or a portion of the data on the device as illustrated in connection with 400 of FIG. 10.

Use of the foregoing as illustrated in FIG. 10 provides for concatenating different portions of data from one or more source devices included in data storage system 412 into a single contiguous data portion on a destination such as the device of the data storage system 410. The foregoing illustrated in FIG. 10 shows multiple source devices with varying amounts of data on each device being copied to a single destination device with a data pull operation using multiple pull sessions. It should be noted that the techniques illustrated in FIG. 10 may also be used with a data push operation where data from one or more source devices may be pushed to a single destination device. Other variations and configurations possible in connection with designating source and destination copy locations are possible as apparent to one of ordinary skill in the art.

It should be noted that other operations may be performed in addition to the copying of a particular data partition. For example, an embodiment performing a data pull operation by multiple FAs, each of the FAs may determine a partial checksum on a copied data partition.

It should be noted that although only a single destination or a single source device may have been illustrated herein, the techniques described herein may be performed in connection with multiple source and multiple target devices. Additionally, although the distributed copying technique as described herein includes processing steps performed by a processor of an FA executing code, the technique described herein may be performed by other processors within the data storage systems. The particular examples set forth herein for purposes of illustration should not be construed as a limitation of the techniques.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing a distributed copying of data from a source to a target using a plurality of processors, the method comprising:
    determining if all partitions of said source have been allocated for copying to said target, wherein said source is divided into a plurality of partitions having a corresponding range from a first partition to a last partition;
    if not all of said partitions have been allocated, allocating one of said partitions for copying to said target;
    updating a migration status indicator for each of said partitions when copying of said each partition to said target is complete, wherein each of said plurality of partitions has a unique corresponding migration status indicator having a migration status value indicating a migration status of said each partition; and
    upon a last executing one of said plurality of processors completing copying of said last partition to said target, having said last executing processor copy any of said remaining partitions which have not yet been copied to said target as indicated in accordance with migration status values of unique migration status indicators associated with said remaining partitions.

2. The method of claim 1, wherein said determining and said updating are performed by each of said plurality of processors, and wherein the method further comprises:
    each processor making a determination as to whether there are any remaining portions unallocated upon completing copying of one of said partitions.

3. The method of claim 2, wherein, said last executing processor determines that all of said partitions have been allocated.

4. The method of claim 1, further comprising:
    partitioning said source into said plurality of partitions wherein each partition corresponds to one or more tracks of data on a source device.

5. The method of claim 1, further comprising:
    updating a processor status indicator to indicate a copy in progress in response to allocating a partition for copying to said processor and while said processor is copying data from said source to said target.

6. The method of claim 5, further comprising:
    determining that a processor is said last executing processor if no other processor has an associated processor status indicator indicating a copy in progress by said other processor.

7. The method of claim 6, further comprising:
    updating a processor status indicator to indicate a copy completion in response to said processor completing copying of a partition and there are no remaining partitions of said source to be copied.

8. The method of claim 1, further comprising:
    updating a processor status indicator to indicate that a processor is unavailable for copying in response to said processor not responding within an expected time interval.

9. The method of claim 8, further comprising:
    having each of said plurality of processors periodically determine if others of said plurality of processors are unavailable, and if any of said unavailable processors became unavailable while copying data from said source, and if a last processor has died prior to either completing copying of a partition allocated to said last processor, or prior to completing migration of any remaining of said partitions that have not yet been copied from said source to said target.

10. The method of claim 9, wherein, when a first processor determines that no other processors are copying data from said source to said target, and determines that at least one other processor has died prior to copying a partition allocated to said other processor for copying, said first processor begins copying any remaining partitions from said source to said destination in accordance with migration status values for said remaining partitions.

11. The method of claim 1, wherein said determining uses a value that is globally accessible to all processors that may copy one of said plurality of partitions, and wherein said value is updated by each of said plurality of processors as said each processor is allocated one of said partitions.

12. The method of claim 1, wherein said source includes a plurality of devices, and wherein for at least one of said plurality of devices, less than all data on said at least one device is included in said source for copying to said target.

13. The method of claim 1, wherein said plurality of processors are included in a data storage system, said source is included in said data storage system, and said plurality of processors are pushing data from said source to said target in a remote data storage system.

14. The method of claim 1, wherein said plurality of processors and said target are included in a data storage system, and said plurality of processors are pulling data from a remote data storage system including said source.

15. A distributed method for performing a task by a plurality of processors, the method comprising:
    determining if all partitions of said task have been allocated for execution, wherein said task is divided into a plurality of partitions having a corresponding range from a first partition to a last partition;
    if not all of said partitions have been allocated, allocating one of said partitions;
    updating a completion status indicator for each of said partitions when execution of said each partition of said task is complete, wherein each of said plurality of partitions has a corresponding unique completion status indicator having a status value indicating a status of said partition; and upon a last executing one of said plurality of processors completing execution of said last partition, having said last executing processor complete execution of any of said remaining partitions of said task which have not yet been completed as indicated in accordance with status values of unique completion status indicators associated with said remaining partitions.

16. The method of claim 15, wherein said determining and said updating are performed by each of said plurality of processors, and wherein the method further comprises:

each processor making a determination as to whether there are any remaining portions unallocated upon completing execution of one of said partitions.

17. The method of claim 16, wherein, said last executing processor determines that all of said partitions have been allocated.

18. The method of claim 15, further comprising:

partitioning said task into said plurality of partitions wherein each partition corresponds to performing a portion of processing steps of said task.

19. The method of claim 15, further comprising:

updating a processor status indicator to indicate a work in progress in response to allocating a partition for execution to said processor and while said processor is executing processing steps to complete said partition.

20. The method of claim 19, further comprising:

determining that a processor is said last executing processor if no other processor has an associated processor status indicator indicating a work in progress by said other processor.

21. The method of claim 20, further comprising:

updating a processor status indicator to indicate a task completion in response to said processor completing execution of a partition and there are no remaining partitions of said task to be completed.

22. The method of claim 15, further comprising:

updating a processor status indicator to indicate that a processor is unavailable in response to said processor not responding within an expected time interval.

23. The method of claim 22, further comprising:

having each of said plurality of processors periodically determine if others of said plurality of processors are unavailable, and if any of said unavailable processors became unavailable while executing said partition, and if a last processor has died prior to either completing execution of a partition allocated to said last processor, or prior to completing execution of any remaining of said partitions.

24. The method of claim 23, wherein, when a first processor determines that no other processors are executing a partition of said task, and determines that at least one other processor has died prior to completing execution of a partition of said task allocated to said other processor, said first processor begins executing any remaining partitions in accordance with status values for said remaining partitions.

25. The method of claim 15, wherein said determining uses a value that is globally accessible to all processors that may execute one of said plurality of partitions, and wherein said value is updated by each of said plurality of processors as said each processor is allocated one of said partitions.

26. A computer program product for performing a distributed copying of data from a source to a target using a plurality of processors, the computer program product comprising code that:

determines if all partitions of said source have been allocated for copying to said target, wherein said source is divided into a plurality of partitions having a corresponding range from a first partition to a last partition;

if not all of said partitions have been allocated, allocates one of said partitions for copying to said target;

updates a migration status indicator for each of said partitions when copying of said each partition to said target is complete, wherein each of said plurality of partitions has a corresponding unique migration status indicator having a migration status value indicating a migration status of said each partition; and upon a last executing one of said plurality of processors completing copying of said last partition to said target, having said last executing processor copy any of said remaining partitions which have not yet been copied to said target as indicated in accordance with migration status values of unique migration status indicators associated with said remaining partitions.

27. The computer program product of claim 26, wherein said code that determines and said code that updates are performed by each of said plurality of processors, and wherein the computer program product further comprises:

each processor including code that makes a determination as to whether there are any remaining portions unallocated upon completing copying of one of said partitions.

28. The computer program product of claim 27, wherein, said last executing processor determines that all of said partitions have been allocated.

29. The computer program product of claim 26, further comprising:

code that partitions said source into said plurality of partitions wherein each partition corresponds to one or more tracks of data on a source device.

30. The computer program product of claim 26, further comprising:

code that updates a processor status indicator to indicate a copy in progress in response to allocating a partition for copying to said processor and while said processor is copying data from said source to said target.

31. The computer program product of claim 30, further comprising:

code that determines that a processor is said last executing processor if no other processor has an associated processor status indicator indicating a copy in progress by said other processor.

32. The computer program product of claim 31, further comprising:

code that updates a processor status indicator to indicate a copy completion in response to said processor completing copying of a partition and there are no remaining partitions of said source to be copied.

33. The computer program product of claim 26, further comprising:

code that updates a processor status indicator to indicate that a processor is unavailable for copying in response to said processor not responding within an expected time interval.

34. The computer program product of claim 33, further comprising:

code in each of said plurality of processors causing said each processor to periodically determine if others of said plurality of processors are unavailable, and if any of said unavailable processors became unavailable while copying data from said source, and if a last processor has died prior to either completing copying of a partition allocated to said last processor, or prior to completing migration of any remaining of said partitions that have not yet been copied from said source to said target.

35. The computer program product of claim 34, wherein, when a first processor determines that no other processors are copying data from said source to said target, and determines that at least one other processor has died prior to copying a partition allocated to said other processor for copying, said first processor begins copying any remaining partitions from said source to said destination in accordance with migration status values for said remaining partitions.

36. The computer program product of claim 26, wherein said code that determines uses a value that is globally accessible to all processors that may copy one of said plurality of partitions, and wherein said value is updated by each of said plurality of processors as said each processor is allocated one of said partitions.

37. The computer program product of claim 26, wherein said source includes a plurality of devices, and wherein for at least one of said plurality of devices, less than all data on said at least one device is included in said source for copying to said target.

38. The computer program product of claim 26, wherein said plurality of processors are included in a data storage system, said source is included in said data storage system, and said plurality of processors are pushing data from said source to said target in a remote data storage system.

39. The computer program product of claim 26, wherein said plurality of processors and said target are included in a data storage system, and said plurality of processors are pulling data from a remote data storage system including said source.

40. A computer program product for performing a distributed task by a plurality of processors, the computer program product comprising code that:
    determines if all partitions of said task have been allocated for execution, wherein said task is divided into a plurality of partitions having a corresponding range from a first partition to a last partition;
    if not all of said partitions have been allocated, allocates one of said partitions;
    updates a completion status indicator for each of said partitions when execution of said each partition of said task is complete, wherein each of said plurality of partitions has a corresponding unique completion status indicator having a status value indicating a status of said partition; and
    upon a last executing one of said plurality of processors completing execution of said last partition, having said last executing processor complete execution of any of said remaining partitions of said task which have not yet been completed as indicated in accordance with status values of unique completion status indicators associated with said remaining partitions.

41. The computer program product of claim 40, wherein said code that determines and said code that updates are performed by each of said plurality of processors, and wherein the computer program product further comprises:
    each processor including code that makes a determination as to whether there are any remaining portions unallocated upon completing execution of one of said partitions.

42. The computer program product of claim 41, wherein, said last executing processor determines that all of said partitions have been allocated.

43. The computer program product of claim 40, further comprising:
    code that partitions said task into said plurality of partitions wherein each partition corresponds to performing a portion of processing steps of said task.

44. The computer program product of claim 40, further comprising:
    code that updates a processor status indicator to indicate a work in progress in response to allocating a partition for execution to said processor and while said processor is executing processing steps to complete said partition.

45. The computer program product of claim 44, further comprising:
    code that determines that a processor is said last executing processor if no other processor has an associated processor status indicator indicating a work in progress by said other processor.

46. The computer program product of claim 45, further comprising:
    code that updates a processor status indicator to indicate a task completion in response to said processor completing execution of a partition and there are no remaining partitions of said task to be completed.

47. The computer program product of claim 40, further comprising:
    code that updates a processor status indicator to indicate that a processor is unavailable in response to said processor not responding within an expected time interval.

48. The computer program product of claim 47, further comprising:
    each of said plurality of processors including code that periodically determines if others of said plurality of processors are unavailable, and if any of said unavailable processors became unavailable while executing said partition, and if a last processor has died prior to either completing execution of a partition allocated to said last processor, or prior to completing execution of any remaining of said partitions.

49. The computer program product of claim 48, wherein, when a first processor determines that no other processors are executing a partition of said task, and determines that at least one other processor has died prior to completing execution of a partition of said task allocated to said other processor, said first processor begins executing any remaining partitions in accordance with status values for said remaining partitions.

50. The computer program product of claim 40, wherein said code that determines uses a value that is globally accessible to all processors that may execute one of said plurality of partitions, and wherein said value is updated by each of said plurality of processors as said each processor is allocated one of said partitions.

* * * * *